United States Patent [19]

Cates et al.

[11] Patent Number: 4,530,804
[45] Date of Patent: Jul. 23, 1985

[54] FORCED DRAFT CROSS FLOW, FREE-PLENUM EVAPORATIVE HEAT EXCHANGER

[75] Inventors: Robert E. Cates, Arnold; Richard H. Harrison, Jr., Columbia; Thomas P. Carter, Laurel, all of Md.

[73] Assignee: Baltimore Aircoil Company, Inc., Jessup, Md.

[21] Appl. No.: 227,574

[22] Filed: Jan. 22, 1981

[51] Int. Cl.³ .............................................. B01F 3/04
[52] U.S. Cl. .............................. 261/30; 261/DIG. 11
[58] Field of Search .......................... 261/30, DIG. 11

[56] References Cited

U.S. PATENT DOCUMENTS

| | | | |
|---|---|---|---|
| 2,732,190 | 1/1956 | Mart | 261/DIG. 11 |
| 2,872,168 | 2/1959 | Mart | 261/DIG. 11 |
| 2,915,302 | 12/1959 | Jacir | 261/30 |
| 3,012,416 | 12/1961 | Dart et al. | 261/30 X |
| 3,265,372 | 8/1966 | Bradley | 261/30 |
| 3,286,999 | 11/1966 | Takeda | 261/DIG. 11 |
| 3,363,885 | 1/1968 | Meek | 261/30 |
| 3,903,212 | 9/1975 | Lefevre | 261/30 |

*Primary Examiner*—Richard L. Chiesa
*Attorney, Agent, or Firm*—David L. Rose; Michael C. Sudol, Jr.; Mario A. Monaco

[57] ABSTRACT

A forced draft crossflow evaporative heat exchange has a turbulent air-liquid interchange zone downstream from the air propulsion means and intermediate the air propulsion means and the heat exchange media. The media is inclined so the upper portion is closer to the air propulsion means than the lower portion.

7 Claims, 3 Drawing Figures

FORCED DRAFT CROSS FLOW, FREE-PLENUM EVAPORATIVE HEAT EXCHANGER

This invention relates to a cross flow evaporative heat exchanger having a forced draft means for propelling air into contact with heated liquid. This invention especially relates to crossflow forced draft cooling towers wherein air entry and exit from the fill is along the same axis. More particularly, this invention relates to a cooling tower designed such that high temperature liquid droplets fall into a turbulent air plenum chamber whereby high velocity turbulent air impacts these free falling liquid droplets and causes a fine breakup of the droplet upon impacting and re-entering the fill. In particular, this invention relates to a cooling tower wherein only fresh, relatively dry ambient air contacts the mechanical components.

BACKGROUND OF THE INVENTION

In evaporative heat exchangers, heat is exchanged between a liquid, e.g., water, and the ambient air. The temperature of the liquid is reduced both by direct heat exchange with the air and by a partial vaporization of the liquid so that heat is removed in the form of latent heat of vaporization, the resultant vapor being removed in the exhaust stream leaving the tower.

In conventional cooling towers, the contact between the liquid and air is enhanced by means of a structure referred to as a packing or fill. The fill is commonly a lattice or framework over which the liquid trickles and/or films while at the same time being exposed to an ambient air stream. The heat exchange properties of a cooling tower are improved not only by increasing the liquid/air interface as the liquid proceeds through the cooling tower, but also by increasing the turbulence of the flow of both liquid and air.

The primary object of this invention is to provide a cooling tower wherein the interface of liquid and air is optimized to provide the maximum thermal heat exchange benefit per unit fan energy consumption per unit capital cost expenditure.

A still further object of this invention is to provide a cooling tower of high thermal efficiency and compactness wherein the admixing of liquid and air in a turbulent stream is improved in the smallest enclosure dimension.

A still further object of this invention is to provide a cooling tower wherein the air motive force equipment for providing an air stream through the tower is shielded and protected from corrosion by avoiding contact with the liquid, the entrained liquid droplets in the air stream or the humid plenum chamber both during normal operation, and during fan-off operation.

With these and other objects in mind, the cooling tower of the present invention comprises a housing having therein a fill spaced apart from fan wall of the housing. In the fan wall is a conventional means to propel an air stream over and through the fill. The face of the fill inclines such that the distance between the wall and the fill increases as the liquid travels downward over the fill. The fill, thus spaced apart from the fan wall mounting the air propulsion means defines a zone of turbulent airflow such that liquid droplet falling into the turbulent zone admix with the incoming air and are thereby driven against the fill facing whereat they are broken into mist, coalesce, fall farther down the fill and then again can drop into the turbulent zone. After passing downwardly over the fill elements and through the turbulent zone the liquid finally collects at the base of the tower in a sump where it can be recirculated or discharged as is required.

The term "forced draft cooling tower" is intended to refer to those cooling towers where the ambient air drawn into the interior of the tower by a propulsion means passes first through the propulsion means before having any contact with the fill within the interior of the tower housing. It also means that the plenum chamber during operation will be at a positive pressure with respect to atmosphere.

The term "induced draft cooling towers" is intended to refer to those cooling towers where the ambient air drawn into the interior of the tower housing passes through the fill and becomes laden with vaporized liquid prior to passing through the propulsion means. It also means that the plenum chamber will be at a negative pressure with respect to atmosphere.

The prior art devices can be distinguished from the present invention on a plurality of counts including the turbulent path of the air taken through the tower the placement of the propulsion means relative to the fill and the absence of any turbulent air zone where liquid drops flow other than into the fill. To the contrary, the prior art uniformly teaches that one should prevent, by means of louvers or vertical fill orientation, the liquid from entering any turbulent plenum zone.

For example, U.S. Pat. No. 2,872,168 shows a forced draft cooling tower such that the air propulsion means is mounted horizontally below liquid retaining louvered walls in the tower base. The plenum space is thereby a dry air zone with exhaust air exiting at the top of the unit.

U.S. Pat. No. 2,732,190 shows a double pumping unit having a vertical fill such that downwardly traveling liquid is not induced to leave the fill structure and move to a turbulent air zone. Further, the air exits upwardly.

Similarly, U.S. Pat. No. 3,286,999 also shows a tower with vertical fill wherein liquid is prevented from entering any turbulent air zone.

In other known commercial units, the drive mechanism is inside the tower housing so that it is subject to corrosion, and although the fill may be inclined for various reasons, the fill face is nevertheless louvered to prevent liquid from falling into a turbulent air zone defined between the fill wall and the fan.

SUMMARY AND DETAILED DESCRIPTION OF THE INVENTION

This invention can be more thoroughly understood by the following description with reference to the accompanying drawings in which.

Figure 1:
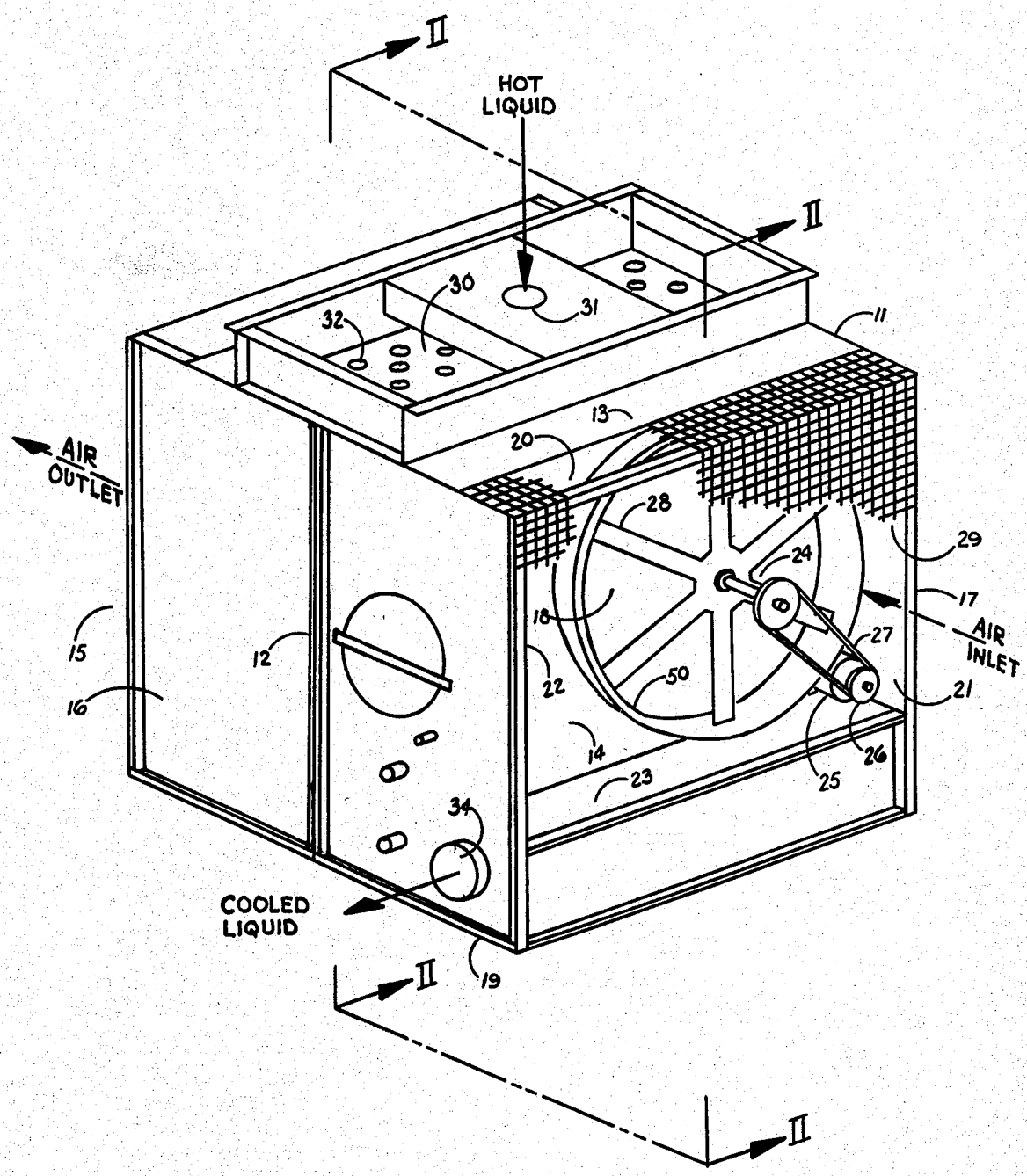
FIG. 1 is an isometric view of a cooling tower of this invention.

Referring now to the drawings and in particular in FIG. 1, there is shown a cooling tower 11 having a housing 12 having a topwall 13, fan walls 14, air exit area 15 and side walls 16, 17, defining therein an interior chamber 18. Tower 11 rests on base 19. At the ambient air inlet 50 in fan wall 14 a recess 20 is formed by flanges 21, 22 respectively in sidewalls 16 and 17 and a shoulder portion 23 in base 19. Recess 20 provides an alcove for the air propulsion means shown as fan-drive-motor assembly 24. Assembly 24 comprises motor 25, pulley 26 and drive belt 27 for turning axial-flow fan 28. A circular axial flow fan is shown as preferred, but other air propulsion means are suitable including centrifugal fans, especially where quiet operation is desired. Fan assembly 24 is protected by screen 29 so as to prevent unintended or accidental intrusion into the moving fan-drive assembly 24. Also shown in FIG. 1 is a conventional liquid distribution pan 30 having an inlet 31 providing for the inflow of high temperature liquid into and throughout the pan 30. Pan 30 communicates into the interior of the tower through a number of dispersion nozzles 32 in said pan 30 so as to distribute the high temperature liquid uniformly over the fill means 33 (shown in FIG. 2) in the interior chamber 18. Nozzles 32 are located in such a pattern that the liquid leaving the upper pan preferably flows only onto fill means 33. There is also located in housing 12 an outlet 34 wherefrom cooled fluid collected in sump 35 (FIG. 2) at base 19 below fill means 33, is removed from tower 11. In other embodiments the liquid can be sprayed directly onto the fill means 33, without using a distribution means such as pan 30.

Fan-drive-motor assembly 24 is shown mounted outside fan wall 14 so that splash or misting of liquid against assembly 24 is minimized during fan-off operation. It is usual for the liquid to contain treatment chemicals such as microbiocides, algaecides, scale and corrosion inhibitors, and other additives to control the quality of the liquid. Unfortunately, these additives are sometimes highly corrosive to unprotected oxidizable surfaces. Thus, the mounting of assembly 24 outside interior chamber 18 in recess 20 is a highly desirable expedient to protect motors, bearings and the like from corrosive deterioration.

There is one aspect of this invention that requires especial attention. In all conventional forced draft cross-flow cooling towers the air flow from an air propulsion means, e.g., the fan, is quite turbulent, especially close to the fan face. That turbulence, prior to this invention was regarded as wholly undesirable. To overcome this supposed disadvantage, the fill face was located as far from the fan face as space permitted. Of course this resulted in either a larger tower than is now found necessary or a smaller longitudinal space to pack the fill. In addition, prior art crossflow towers employed straightening vanes, or other expedients to smooth the air flow so that a laminar flow was obtained. What is now discovered is that, surprisingly, the space between the fan face and the fill face can be shortened and all auxilliary means to implement laminar air flow eliminated. This foreshortening provides a more compact tower, shorter in longitudinal dimensions of considerably enhanced heat transfer.

Figure 2:
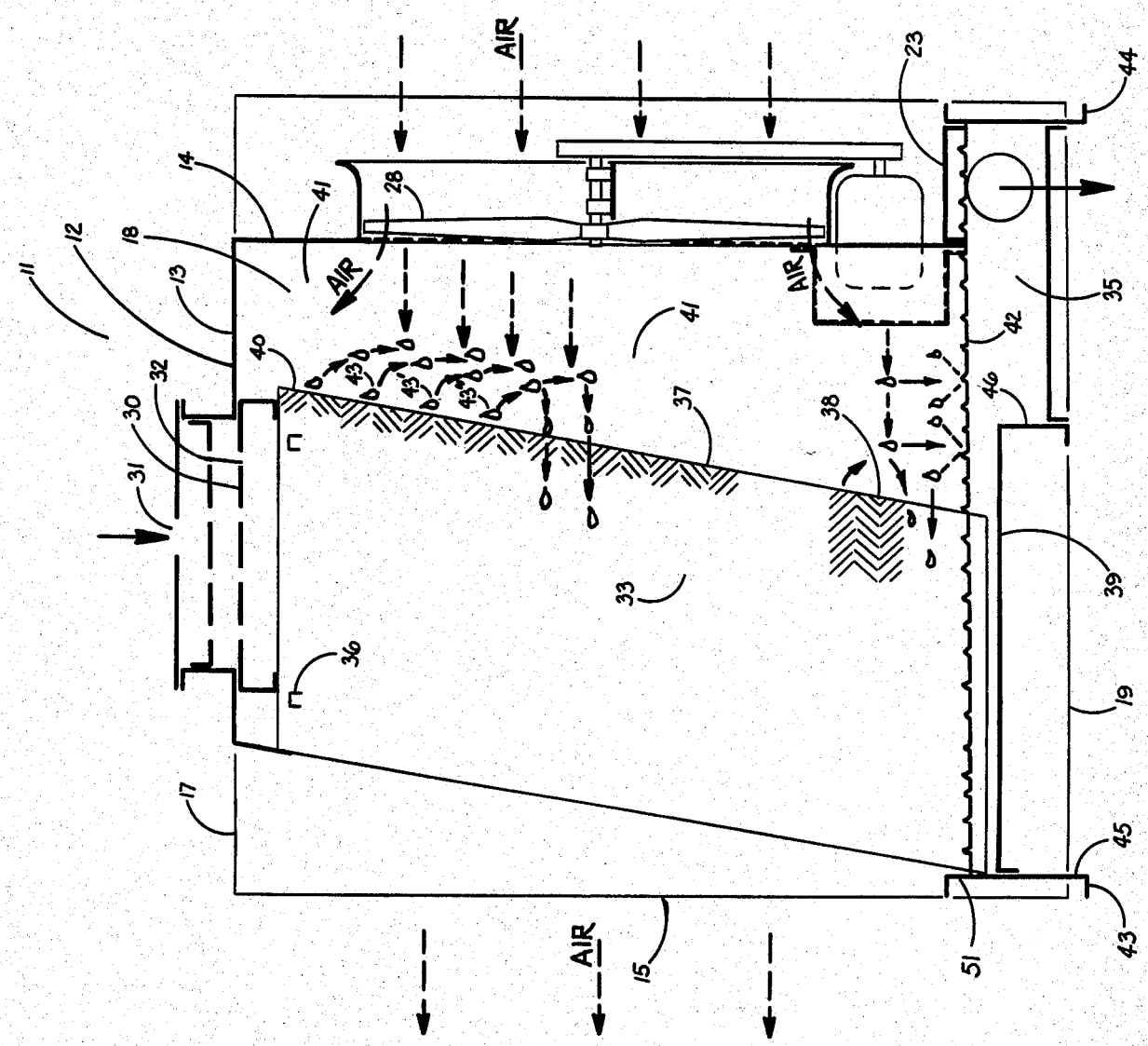
FIG. 2 is a cross sectional view through II—II of FIG. 1 showing in particular the plenum chamber of the cooling tower.

Referring now to FIG. 2 there is shown cooling tower 11 with housing 12 fan walls 14, and air exit area 15. In the interior chamber 18 of tower 11 is located fill means 33 which is suspended by brackets 36 attached to side walls 16,17. Other attachment and anchoring arrangements are entirely suitable and have no essential bearing on operation of the tower. What is important is that the stability of fill means 33 is insured against shifting. The fill means is of any conventional design, but most preferably of the design specified in co-pending application, entitled ANGULAR GROOVED FILL UNIT FOR WATER COOLING TOWER, CARTER et al., Ser. No. 227,302, now U.S. Pat. No. 4,361,426, filed even date herewith and incorporated herein by reference in its entirety. Fill means 33 most suitably extends laterally across the entire interior of chamber 18 between sidewalls 16, 17. Fill means 33 is spaced apart from fan wall 14 so as to define therebetween a plenum chamber 41. Face 37 of the fill means 33 is slanted such that the lower portion 38 at the base 39 is at a greater distance from fan wall 14 than is the upper portion 40 of fill means 33. Generally, it is preferred that the inclination from the uppermost portion 40 to base 39 is uniform although it is quite suitable that the slope of face 37 follow a curve. Thus, face 37 can present a spherical segment, concave, convex, hyperbolic, or any geometrical curve front to fan wall 14. What is essential is that with respect to the fill or any individual plate thereof, each point on the terminus of the fill or a plate thereof facing fan wall 14 is no closer fan wall 14 than a point above, and that a least lower terminal points are farther from fan wall 14 than the points above.

In a most desirable fill design, a plurality of vertically-oriented plates are in spaced apart relationship. In such a design, the plates need not be planar, but can comprise arcuate sheets. However, it is necessary that the horizontal axis of each plate be generally aligned with the direction of airflow through the tower. In this most suitable design, the edge of each plate facing fans wall 14 inclines inwardly so that plenum chamber 41 is formed as described above. In the preferred embodiment the entire face 37 is composed of adjacaent fill plates aligned so that all plates terminate in the same plane on face 37. This, however, is not a requisite to operation, and the termini of each plate forming the face 37 of fill means 33 can be at varying rather than uniform distances from individually fan wall 14 at any reference height.

If the angle of inclination of the face 37 of fill is uniform, i.e. the slope does not vary, then the plenum chamber 41 will take on a trapezoidal cross-sectional configuration with the top wall 13, front wall 14, fill front 37 and the surface 42 of sump 35 forming the sides of the trapezoid. Of course, unless all the members of fill 33 are in alignment, the trapezoids will not be congruent. Congruency is not essential to operation and, therefore, the fill sheets may be incongruent, if desired.

Base 19 is supported on pedestals 43 and 44 preferably having defined therein an upwardly extending recess 45 formed by an inset 45 into basin wall 51, upstanding element 46, and step portion 39. The roof portion 39 is reinforced by said elements 46 to withstand the entire weight of the assembly and reduce operation weight of the tower by displacing liquid, and also permitting the prongs of a forklift truck assembly to be inserted into inset 45 to facilitate transport of the cooling tower 11 to a desired location.

The operation of the cooling tower will now be discussed.

Liquid to be cooled is directed through inlet 31 where it spreads onto distribution pan 30 and drips through nozzle 32 that communicates through topwall 13 into interior chamber 18 as shown in FIG. 2. There the liquid droplets are distributed over the top portion of fill means 33 and flow downward. The fill face 37 of fill 33 will direct droplets exemplified by droplet 43 into plenum chamber 41. Thus, for example as liquid droplet 43 nears the outer edge 37 it falls vertically into the turbulent air zone in plenum chamber 41. The airstream driven through chamber 18 by fan 28 impacts drop 43 and drives it horizontally so it is blown into fill means 33, strikes the fill means, and is sheared into a smaller liquid particle for enhanced heat transfer. The process is repeated with drops 43' and 43", and all other droplet or rivulets issuing from fill face 37 into plenum chamber 41.

As referred to previously, a turbulent airflow is most desirable in plenum 41. This turbulence enhances air/-liquid intermixture and forces/liquid droplets falling into the plenum chamber against the fill face. Of course this non-laminar airflow in the plenum becomes more generally horizontally directional as it passes into and through the fill where it is straightened under the influence of the air passages through the fill, which passages generally are aligned with the longitudinal axis of the tower, the axis from fan means to the air exit from the fill. After leaving the fill it may exhaust from air exit area 15 as shown or through other convenient vents in the top wall 13 for example.

Since air turbulence is now found to be desirable it is highly preferred that no fan drive motor assembly parts or similar devices are located to reduce the fan induced turbulence or non-laminar airflow. Such of these devices include bearings, supports for bearings, straightening vanes, and the like. Also, all barriers, that are employed by the prior art to contain liquid in the fill region, and thus employed, impede airflow, are absent. This absence allows the turbulence to extend or penetrate at least partially into the fill region extending into the depth of fill 33 from face 37.

Figure 3:
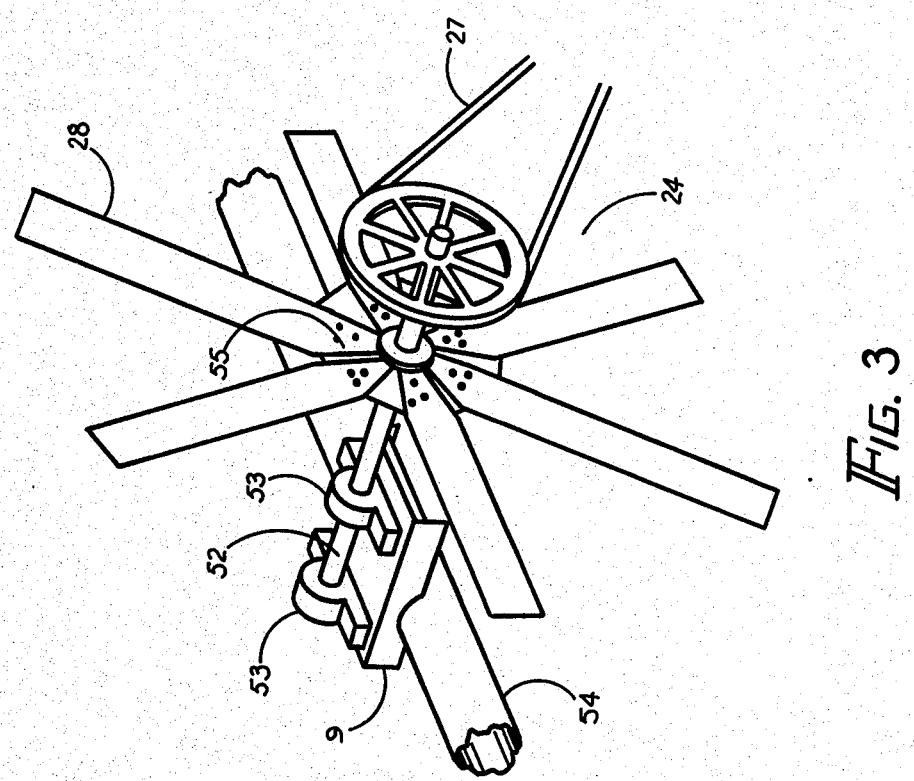
FIG. 3 is a view of a air propulsion means and its supporting members.

As shown in FIG. 3, it is not always possible to mount a fan 28 so that the non-laminar airflow from the fan face to the fill face is void of any obstructions. In this embodiment the cooling tower is of such a size that sound design dictates an interior location for bearing 53 supporting shaft 52.

Bearings 53 are thus located downstream of the fan 28, but the turbulent smoothing effects of these bearings the presence of this bearing and its support beam 54 might have is minimized by having bearings 53 lie entirely within the cylindrical projection of the fan hub 55. Support means 54 is preferably as far removed from fan 28 as sound desire allows so as not to interfere with or reduce the initial turbulence produced by the fan.

Further the motor is mounted below the plume of vapor emitting from the tower between fan blades when the tower is operating in a fan-off mode. This protects the fan from the effects of corrosion that constant exposure to a high temperature laminar plume would have.

Having thus described the invention with particular reference to the preferred forms thereof, it will be obvious to those skilled in the art to which the invention pertains, after understanding the invention, that various changes and modifications may be made therein without departing from the spirit and scope of the invention as defined by the claims appended hereto.

What is claimed and desired to be secured by Letters Patent is:

1. A forced draft evaporative heat exchanger comprising, in combination, a housing having a base, sidewalls, fan wall, endwall and a topwall so as to define therein an interior chamber; an opening in the fan wall having mounted therein a fan connected to a drive means; at least one opening in the endwall or top wall for the egress of air from the interior chamber of said housing; a heat exchange means having a first edge facing the top wall and a second edge facing the fan wall mounted in the interior chamber extending substantially from the topwall to the base and from one sidewall to the other; means for distributing liquid over the top edges of said heat exchange means; and means for collecting liquid after it has passed down said heat exchange means; said second edge of said heat exchange means having a slope from the vertical such that any point on said edge is no closer to the fan wall than any other point on said edge above said point; and said second edge of said heat exchange means being in spaced relation to the fan wall so as to provide a plenum air zone defined therebetween, whereby liquid can be freely directed to drop from said second edge of said heat exchange means into said plenum, said fan forcing ambient air into the interior chamber of said housing directly against said second edge and being below said first edge of said exchange means.

2. The evaporative heat exchanger of claim 1 wherein the heat exchange means has edges that terminate in the same plane.

3. The evaporative heat exchanger of claim 1 wherein a trapezoidal shape is formed by the edge of said heat exchange means, the fan wall, the top wall and base of said housing.

4. The evaporative heat exchanger of claim 1 wherein the fan is located intermediate the heat exchange means and the drive means of said fan.

5. The evaporative heat exchanger of claim 4 wherein the drive means is a motor and said motor is located below the horizontal axis of the fan about which said fan rotates.

6. The evaporative heat exchanger of claim 1 having an air pathway extending from said air propulsion means to the face of said evaporative heat exchanger wherein said air pathway is a free flow pathway.

7. The heat evaporative heat exchanger of claim 1 wherein said evaporative heat exchanger is a cooling tower and the heat exchanger means is fill.

* * * * *